Patented June 14, 1949

2,473,319

UNITED STATES PATENT OFFICE 2,473,319

GASKET AND GASKET COMPOSITION

Herbert A. Winkelmann, Chicago, Ill., assignor to Dryden Rubber Company, Chicago, Ill., a corporation of Illinois No Drawing. Application November 10, 1947, Serial No. 785,183

4 Claims. (Cl. 260—19)

The invention relates to a gasket and gasket composition particularly adapted for use in the vacuum brake assembly of an automobile.

Leather gaskets having a wick containing a lubricant to prevent the sticking of the gasket to the cylinder walls are commonly used in these vacuum brake assemblies. However, due to the high price of leather attempts have been made to make these gaskets out of synthetic rubber, but hitherto all attempts have failed because the compositions stuck or "froze" to the cylinder walls. It was found, for example, that after a truck stood over night it required more pressure to remove the piston of the brake mechanism than a man could exert by pressing as hard as he could with his foot.

An object of this invention is to provide a synthetic rubber gasket which will not freeze to the cylinder walls even when used without a wick.

Another object is to provide a suitable gasket for a vacuum brake assembly which is less expensive than a leather gasket.

A further object is to provide a self-lubricating gasket composition.

Other objects will become apparent from the following specification.

In accordance with this invention, the following ingredients in proportions as stated are mixed together:

Butadiene-acrylonitrile copolymer synthetic rubber containing 20 to 55% by weight of acrylonitrile, preferably from 40 to 45% of acrylonitrile, the remaining being at least 90% by weight butadiene—25 to 65% by weight of the composition, preferably 30% to 40% by weight of the composition.

A liquid petroleum oil, at least 90% by weight, having a boiling point at least 150° above centigrade, and at least 75% consisting of aliphatic hydrocarbons—25 to 60, preferably 35 to 50 parts by weight on 100 parts by weight of copolymer.

Graphite—10 to 125, preferably 10 to 25 parts by weight on 100 parts by weight of copolymer.

A thermosetting phenol formaldehyde resin, preferably a solid phenol formaldehyde resin of the type sold by Durez Plastics & Chemical, Inc. under the name of Durez 12687—10 to 75, preferably 10 to 35 parts by weight on 100 parts by weight of copolymer.

Sulfur—1 to 5 parts by weight on 100 parts by weight of copolymer.

Vulcanization accelerator such as mercaptobenzothiazyl-disulfide—0 to 5, preferably 1 to 2 parts by weight on 100 parts by weight of copolymer.

Rubber antioxidant such as phenyl-beta-naphthylamine—0 to 5, preferably 0.5 to 2 parts by weight on 100 parts by weight of copolymer.

Carbon black—0 to 125, preferably 50 to 125 parts by weight on 100 parts by weight of copolymer.

Paraffin—0 to 5, preferably 1 to 4 parts by weight on 100 parts by weight of copolymer.

Stearic acid—0 to 2, preferably .2 to 1 parts by weight on 100 parts by weight of copolymer.

Zinc oxide—0 to 10 parts by weight on 100 parts by weight of copolymer.

Ester plasticizer compatible with the copolymer such as tributoxy ethyl phosphate, tricresyl phosphate, dioctyl phthalate, dibutyl sebacate, dibutyl phthalate, dibenzyl sebacate—0 to 30, preferably 10 to 30 parts by weight on 100 parts by weight of copolymer.

It is apparent from the above that the most important ingredients are butadiene-acrylonitrile copolymer synthetic rubbers, petroleum oil, graphite, phenol formaldehyde resin, and vulcanizing agent. The graphite is particularly important in giving desirable slip and should not be decreased below 10 parts per 100 parts of the butadiene-acrylonitrile copolymer. The petroleum oil likewise is useful for imparting slip and also for giving a self-lubricating effect. The phenol formaldehyde resin imparts slip and aids in obtaining high gloss. The three ingredients, graphite, oil and phenol formaldehyde resin, act together to give the desirable characteristics, and it has been found that no one of these can be eliminated without detrimental effect.

For some purposes where hardness is not important, it has been found that polyvinyl chloride resins may be substituted for the phenol formaldehyde resins, particularly blends of polyvinyl chloride and butadiene-acrylonitrile synthetic rubber.

Use of carbon black aids in obtaining slip. Where carbon black is used less phenol formaldehyde resin is necessary to give the desirable slip characteristics.

The type of butadiene-acrylonitrile synthetic rubber is important. In general the acrylonitrile content of the copolymer should not be substantially less than 20% by weight of the copolymer.

Ester plasticizers may be used with the copolymer to increase flexibility. Tributoxyethyl phosphate is particularly useful in improving low temperature flexibility.

The compositions of this invention are molded by heat and pressure into the form of a gasket. The temperature and time is any time suitable for vulcanizing a butadiene-acrylonitrile synthetic rubber, and suitably may be at a temperature from 275 to 320° F. for a period of time from 10 to 30 minutes depending upon the thickness.

The gasket made from my composition is characterized in that it has no drag and feels smooth and slippery. The use of a polished and chrome plated mold enhances the smoothness. The gasket has a further advantage of being oil resistant. It is self-lubricating due to exudation and sweating out of the petroleum oil which is only partially compatible with the copolymer.

The following are examples of some specific compositions which have given satisfactory results:

|  | Example No. | | |
|---|---|---|---|
|  | 24 | 40 | 51 |
| Butadiene-acrylonitrile copolymer of 45% acrylonitrile | 100 |  |  |
| Butadiene-acrylonitrile copolymer of 30% acrylonitrile |  | 100 |  |
| Butadiene-acrylonitrile copolymer of 25% acrylonitrile |  |  | 100 |
| Gastex (carbon black) | 110 | 110 | 110 |
| Graphite | 15 | 15 | 15 |
| Durez 12687 (phenol formaldehyde resin) | 20 | 20 | 15 |
| Stearic acid | 0.5 | 0.5 | 0.5 |
| Sulfur | 1.5 | 1.5 | 1.5 |
| Altax (mercaptobenzothiazyl disulfide) | 1.5 | 1.5 | 1.5 |
| ZnO | 5 | 5 | 5 |
| Paraffin | 3 | 3 | 3 |
| Phenyl-beta-naphthylamine | 1 | 1 | 1 |
| Tributoxyethyl phosphate | 15 | 15 | 15 |
| Petroleum oil | 45 | 45 | 45 |
| Tensile p. s. i | 855 | 995 | 875 |
| Percent Elongation | 225 | 210 | 290 |
| Modulus@200% | 830 | 935 | 740 |
| Lbs. Tear | 185 | 145 | 145 |
| Hardness | 74 | 65 | 75 |

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

I claim:

1. A gasket composition comprising from 25% to 65% by weight of a butadiene-acrylonitrile copolymer synthetic rubber containing acrylonitrile in an amount not less than 20% by weight of the copolymer, a liquid petroleum oil at least 90% by weight having a boiling point of at least 150° C. and at least 75% consisting of aliphatic hydrocarbons, said petroleum oil being present in an amount from 25 to 60 parts by weight on 100 parts by weight of said copolymer, graphite in amount from 10 to 125 parts by weight on 100 parts by weight of said copolymer, a thermosetting phenol formaldehyde resin in amount from 10 to 35 parts by weight on 100 parts by weight of said copolymer, and sulfur from 1 to 5 parts by weight on 100 parts by weight of said copolymer.

2. A gasket composition comprising 30% to 40% by weight of a butadiene-acrylonitrile copolymer synthetic rubber containing 20% to 55% of acrylonitrile, a liquid petroleum oil at least 90% by weight having a boiling point of at least 150° C. and at least 75% consisting of aliphatic hydrocarbons, said petroleum oil being present in an amount from 35 to 50 parts by weight on 100 parts by weight of copolymer, carbon black in an amount from 50 to 125 parts by weight on 100 parts by weight of copolymer, a thermostetting phenol formaldehyde resin in an amount from 10 to 35 parts by weight on 100 parts by weight of copolymer, sulfur 1 to 5 parts by weight on 100 parts by weight of copolymer, vulcanization accelerated 1 to 2 parts by weight on 100 parts by weight of copolymer, rubber antioxidant .5 to 2 parts by weight on 100 parts by weight of copolymer, graphite 10 to 25 parts by weight on 100 parts by weight of copolymer, paraffin 1 to 4 parts by weight on 100 parts by weight of copolymer, stearic acid .2 to 1 parts by weight on 100 parts by weight of copolymer, an ester plasticizer compatible with said copolymer in an amount from 10 to 30 parts by weight on 100 parts by weight of copolymer.

3. A gasket consisting of a body in the form of a ring having the vulcanized composition of claim 1.

4. A gasket consisting of a body in the form of a ring having the vulcanized composition of claim 2.

HERBERT A. WINKELMANN.

REFERENCES CITED

The following references are of record in the file of this patent:

UNITED STATES PATENTS

| Number | Name | Date |
|---|---|---|
| 2,358,290 | Kraft | Sept. 12, 1944 |
| 2,373,461 | Crampton | Apr. 10, 1945 |

Certificate of Correction

June 14, 1949.

Patent No. 2,473,319.

HERBERT A. WINKELMANN

It is hereby certified that errors appear in the printed specification of the above numbered patent requiring correction as follows:

Column 4, line 20, claim 2, for "thermostetting" read *thermosetting*; line 25, same claim, for "accelerated" read *accelerator*;

and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*